Patented Feb. 9, 1926.

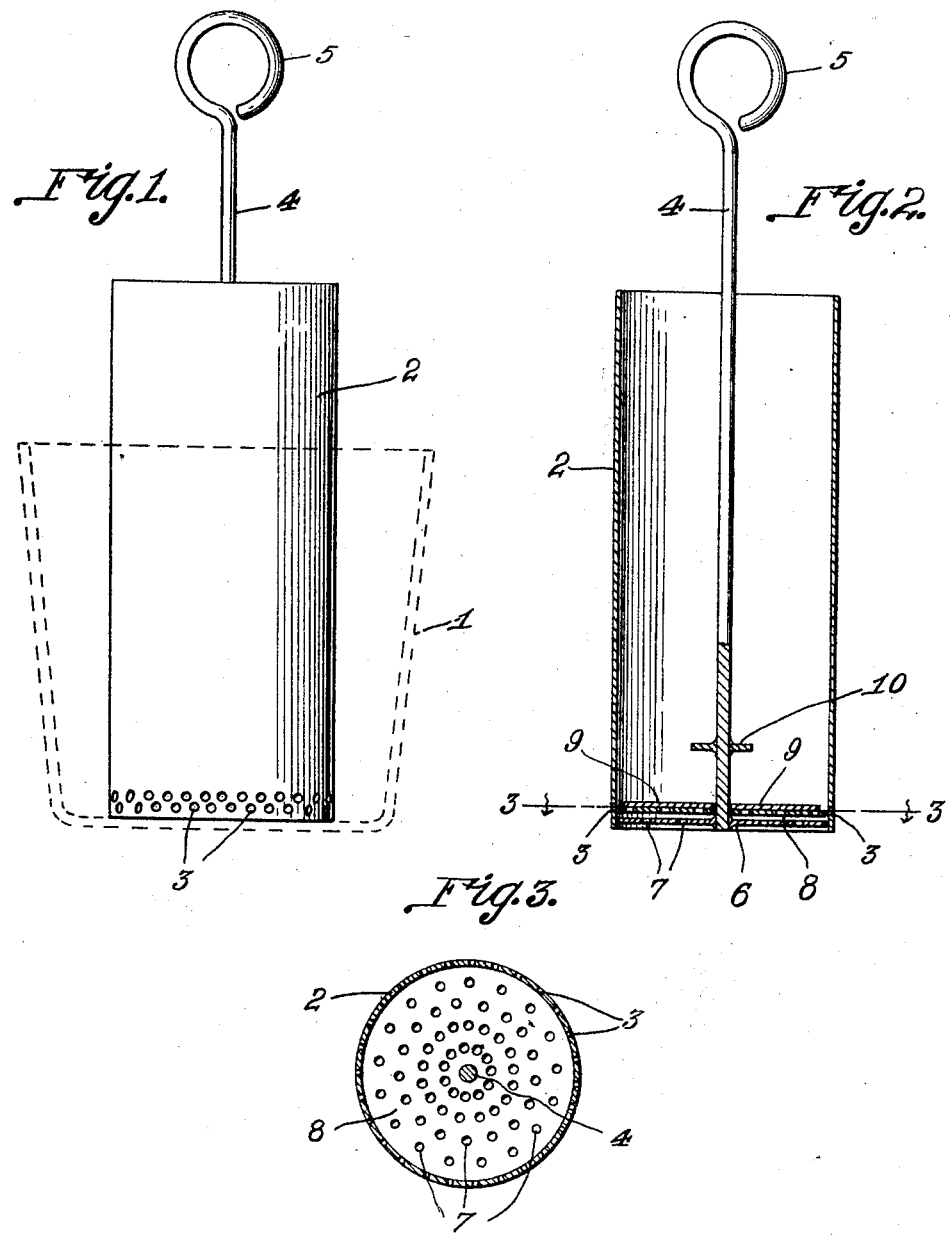

1,572,764

UNITED STATES PATENT OFFICE.

JOHN E. CHATTIN, OF DAHLONEGA, GEORGIA.

EGG BEATER.

Application filed May 31, 1924. Serial No. 717,118.

*To all whom it may concern:*

Be it known that I, JOHN E. CHATTIN, a citizen of the United States, residing at Dahlonega, in the county of Lumpkin and State of Georgia, have invented new and useful Improvements in Egg Beaters, of which the following is a specification.

The object of this invention is the construction of a culinary article primarily designed for beating eggs and which is of an extremely simple construction so that the same may be cheaply manufactured and sold and which will perform its functions with ease and accuracy.

More specifically, the improvement comprises a cylinder perforated adjacent to the bottom thereof and having movable therethrough a hand operated rod carrying on its lower end a fixed perforated disk and loosely mounted thereon but limited in their movement on the rod other disks, one of which being perforated, the device being arranged in a bowl containing the eggs to be mixed and the rod being rapidly reciprocated in the cylinder, causes the disks to quickly act on the eggs to beat the same.

To the attainment of the foregoing, the invention consists in the improvement as hereinafter described and definitely claimed.

In the drawing:—

Figure 1 is a side elevation of the improvement, the dotted lines illustrating a receptacle in which my device is arranged.

Figure 2 is a side elevation of the improvement, with parts in section.

Figure 3 is a sectional view on the line 3—3 of Figure 2.

My improvement is designed to be placed in a receptacle such as is illustrated in Figure 1, by dotted lines and indicated by the numeral 1. The improvement comprises a cylinder 2 having adjacent to its bottom circumferential series of apertures 3. The cylinder is of a length greater than the height of the receptacle 1.

Movable in the cylinder there is a rod 4 having its outer end rounded to provide a finger hold 5. The rod is of a greater length than the cylinder so that its end 5 is projected therebeyond. On the lower end of the rod there is fixed a disk 6 of a size almost equalling the cross sectional diameter of the cylinder 1. This disk is fixed to the rod and is provided with annular series of apertures 7. Loose upon the rod and directly above the disk 6 there is a similarly perforated but smaller disk 8, while above the disk 8 there is arranged for free sliding on the rod a non-perforated disk 9. The rod is formed with a shoulder 10 to limit the movement of the disks on the rod when the latter is reciprocated.

The whites are separated from the yokes of the eggs and the white of say two or three eggs is placed in the bowl. The cylinder is then arranged in the bowl over the eggs. The cylinder is held from movement by one hand of the operator and then the operator employs his second hand for rapidly reciprocating the rod 4. The upward movement of the rod creates a suction to draw the eggs from the bowl through the perforations 3 of the cylinder. The downward movement of the rod forces the tenacious liquid through the perforations in the lower disc 8 and likewise against and through the perforations in the intermediate disc, partly raising this disc on the rod so that the said liquid will be brought into contact with the non-perforated upper disc 9. This subjects the white of the egg to a suction, an agitation and a direct pressure thereon by the upper non-perforated disc and a partial pressure by the perforated discs, so that the white of the egg is soon reduced to a froth. The yoke of the egg may be treated in a like manner.

Having described the invention, I claim:—

An egg beater comprising a cylinder designed to be received in a receptacle and having its lower end provided with a series of apertures, a rod having an outer rounded end movable in the cylinder, said rod having an apertured disk on its inner end, a second apertured disk freely mounted upon the rod above the first mentioned disk, a third non-threaded disk freely movable on the rod and resting on the last mentioned disk, a stop element on the rod above the last mentioned disk, all as and for the purpose set forth.

In testimony whereof I affix my signature.

JOHN E. CHATTIN.